(12) United States Patent
Kingsborough et al.

(10) Patent No.: US 11,692,942 B2
(45) Date of Patent: Jul. 4, 2023

(54) PORTABLE SPECTROMETER FOR CHEMICAL SENSING

(71) Applicant: Massachusetts Institute of Technology, Cambridge, MA (US)

(72) Inventors: Richard Kingsborough, Groton, MA (US); Alexander Stolyarov, Belmont, MA (US); Shane Tysk, Arlington, MA (US); Lauren Cantley, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 314 days.

(21) Appl. No.: 16/999,667

(22) Filed: Aug. 21, 2020

(65) Prior Publication Data

US 2021/0055228 A1 Feb. 25, 2021

Related U.S. Application Data

(60) Provisional application No. 62/890,215, filed on Aug. 22, 2019.

(51) Int. Cl.
*G01N 21/78* (2006.01)
*G01N 21/77* (2006.01)
*G01N 21/31* (2006.01)

(52) U.S. Cl.
CPC .............. *G01N 21/78* (2013.01); *G01N 21/31* (2013.01); *G01N 2021/7756* (2013.01); *G01N 2021/7773* (2013.01); *G01N 2201/0627* (2013.01)

(58) Field of Classification Search
CPC ............... G01N 21/78; G01N 21/31; G01N 2021/7756; G01N 2021/7773; G01N 2201/0627
See application file for complete search history.

(56) References Cited

U.S. PATENT DOCUMENTS 4,241,998 A * 12/1980 Farkas ................. G01N 21/255
356/319
6,051,187 A * 4/2000 Hughes .................... A61L 2/28
435/31

(Continued)

FOREIGN PATENT DOCUMENTS

EP 1274983 2/2012

OTHER PUBLICATIONS

Parde, "Lincoln Laboratory researchers develop a fabric that can sense chemical vapors;" Retrieved from https://www.ll.mit.edu/news/lincoln-laboratory-researchers-develop-fabric-can-sense-chemical-vapors#:~:text=News,Lincoln%20Laboratory%20researchers%20develop%20a%20fabric%20that%20can%20sense%20chemical,exposure%20to%20a%20harmful%20chemical.&text=Many%20people%20may%20recall%20using,during%20high%20school%20chemistry%20experiments; Oct. 18, 2019; 4 pages.

(Continued)

*Primary Examiner* — Elizabeth A Robinson
*Assistant Examiner* — Ryan J Dowty
(74) *Attorney, Agent, or Firm* — Daly, Crowley, Mofford & Durkee, LLP

(57) ABSTRACT

Techniques are disclosed for a chemical sensor architecture based on a fabric-based spectrometer. An example apparatus implementing the techniques includes a portable spectrometer device including a first fabric layer and a second fabric layer coupled to the first fabric layer to form a pouch. The second fabric layer includes a fiber fabric spectrometer substrate comprising a fiber material including one or more electronic devices, wherein the pouch is configured to receive a colorimetric substrate and the fiber fabric spectrometer substrate is configured to measure reflectance of a colorimetric substrate disposed in the pouch.

13 Claims, 15 Drawing Sheets

(56) References Cited

U.S. PATENT DOCUMENTS

| | | | |
|---|---|---|---|
| 6,368,558 | B1 | 4/2002 | Suslick et al. |
| 6,495,102 | B1 | 12/2002 | Suslick et al. |
| 7,261,857 | B2 | 8/2007 | Suslick et al. |
| 9,880,137 | B2 | 1/2018 | Lim et al. |
| 2005/0171449 | A1 | 8/2005 | Suslick et al. |

OTHER PUBLICATIONS

Costero, et al., "Selective Detection of Nerve Agent Simulants by Using Triarylmethanol-Based Chromogenic Chemodoimeters;" European Journal of Organic Chemistry; Jul. 25, 2012; 10 Pages.

Feng, et al., "A Colorimetric Sensor Array for Identifcation of Toxic Gases Below Permissable Exposure Limits;" Chemical Communications, The Royal Society of Chemistry; Feb. 11, 2020; 3 Pages.

Feng, et al., "Colorimetric Sensor Array for Determination and Identification of Toxic Industrial Chemicals;" Analytical Chemistry, vol. 82, No. 22; Nov. 15, 2010; 8 Pages.

Feng, et al., "A Simple and Highly Sensitive Colorimetric Detection Method for Gaseous Formaldehyde;" Journal of the American Chemical Society, vol. 132; Mar. 10, 2010; 2 Pages.

Janzen, et al., "Colorimetric Sensor Arrays for Volatile Organic Compounds;" Analytical Chemistry, vol. 78, No. 11; Jun. 1, 2006; 10 Pages.

Kingsborough, et al., "Fiber-Based Chemical Sensing and Sensing Platforms with Colorimetric Dyes;" Proceedings of SPIE, vol. 10629; May 31, 2018; 10 Pages.

Kostesha, et al., "Development of the Colorimetric Sensor Array for Detection of Explosives and Volatile Organic Compounds in Air;" Proceedings of SPIE, vol. 7673; Apr. 10, 2010; 10 Pages.

Li, et al., "Colorimetric Sensor Array for Monitoring CO and Ethylene;" Analytical Chemistry, vol. 91; Dec. 14, 2018; 6 Pages.

Lim, et al., "An Optoelectronic Nose for the Detection of Toxic Gases;" Nature Chemistry, vol. 1; Sep. 13, 2009; 6 Pages.

Lin, et al., "A Colorimetric Sensor Array for Detection of Triacetone Triperoxide Vapor;" Journal of the American Chemical Society, vol. 132; Oct. 15, 2010; 3 Pages.

Lin, et al., "Preoxidation for Colorimetric Sensor Array Detection of VOCs;" Journal of the American Chemical Society, vol. 133; Oct. 3, 2011; 4 Pages.

Rakow, et al., "A Colorimetric Sensor Array for Odour Visualiztion;" Nature, vol. 406; Aug. 17, 2000; 4 Pages.

Royo, et al., "Chromogenic and Fluorogenic Reagents for Chemical Warfare Nerve Agents' Detection;" Chemical Communications, The Royal Society of Chemistry; Aug. 23, 2007; 9 Pages.

Royo, et al., Chromogenic, Specific Detection of the Nerve-Agent Mimic DCNP (a Tabun Mimic)**; European Journal European Chemistry, vol. 17; 4 Pages.

* cited by examiner

PORTABLE SPECTROMETER FOR CHEMICAL SENSING

CROSS-REFERENCE TO RELATED APPLICATION

This application claims the benefit of and priority to U.S. Provisional Application No. 62/890,215, filed on Aug. 22, 2019, which is herein incorporated by reference in its entirety.

STATEMENT REGARDING FEDERALLY SPONSORED RESEARCH

This invention was made with government support under FA8702-15-D-0001 awarded by the U.S. Air Force. The government has certain rights in the invention.

BACKGROUND

The threat of human and animal exposure to chemical agents is an area of great concern. Some chemical agents (e.g., so-called chemical weapon agents (CWAs)) have properties which can cause disease or death to human beings. In general, CWAs may be organized into categories according to the physiological manner in which they affect the human body. For example, nerve agents, sometimes referred to as nerve gases, are substances that disrupt the mechanisms by which nerves transfer messages to organs in the human body. Due to the hazardous effects of such chemical agents, chemical threat sensing is a topic of substantial scientific interest and pressing need.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

The concepts, systems, and techniques described herein are directed toward a chemical sensor architecture based on a fabric-based spectrometer. In an embodiment, the fabric-based spectrometer is configured for the detection of volatile (vapor-phase) and non-volatile (liquid-phase) in a flexible, durable, and wearable form factor.

In accordance with one example embodiment provided to illustrate the broader concepts, systems, and techniques described herein, a portable spectrometer device may include a first fabric layer and a second fabric layer coupled to the first fabric layer to form a pouch. The second fabric layer may include a fiber fabric spectrometer substrate comprising a fiber material including one or more electronic devices, wherein the pouch is configured to receive a colorimetric substrate and the fiber fabric spectrometer substrate is configured to measure reflectance of a colorimetric substrate disposed in the pouch.

In one aspect, the portable spectrometer device may further include at least one colorimetric substrate disposed in the pouch.

In one aspect, a surface of the colorimetric substrate is disposed over a surface of the fiber fabric spectrometer substrate.

In one aspect, the portable spectrometer device may also include a control component coupled to the fiber fabric spectrometer substrate and configured to control at least one of the one or more electronic devices of the fiber fabric spectrometer substrate to measure reflectance of the colorimetric substrate.

In one aspect, the control component is disposed in the pouch.

In one aspect, the at least one colorimetric substrate comprises at least one colorimetric sensor element, the at least one colorimetric sensor element configured to undergo an electronic structure change upon reaction with an analyte.

In one aspect, the portable spectrometer device may further include means for aligning the colorimetric substrate with the fiber fabric spectrometer substrate.

In one aspect, the portable spectrometer device may further include means for calibrating the fiber fabric spectrometer substrate.

In one aspect, the one or more electronic devices comprise a plurality of light emitting diodes (LEDs) and a plurality of photodiodes, and the colorimetric substrate is disposed such that the at least some of the plurality of light emitting diodes (LEDs) and photodiodes face the colorimetric substrate.

In one aspect, the one or more electronic devices comprise at least one of: a plurality of light emitting diodes (LEDs); and a plurality of photodiodes.

In one aspect, the one or more electronic devices comprise a plurality of LEDs to emit frequency modulated light onto the at least one colorimetric sensor element.

In one aspect, the one or more electronic devices comprise a plurality of photodiodes to detect the reflectance of the at least one colorimetric substrate.

In one aspect, the plurality of photodiodes comprises one of silicon (Si) photodiodes or indium gallium arsenide (InGaAs) photodiodes.

In one aspect, the one or more electronic devices comprise at least one red, green, blue (RGB) LED-photodiode (PD) quartet, the at least one RGB LED-PD quartet utilized to detect the reflectance of a corresponding colorimetric substrate of the at least one colorimetric substrate.

In one aspect, the portable spectrometer device may further include a light blocking substrate configured to reduce ambient light intensity, the light blocking substrate disposed such that the colorimetric substrate is between the fiber fabric spectrometer substrate and the light blocking substrate.

In one aspect, the at least one colorimetric substrate is comprised of a fabric, paper, or glass.

In accordance with one example embodiment provided to illustrate the broader concepts, systems, and techniques described herein, a method for detecting exposure to a chemical threat may include providing a device comprising a first fabric layer and a second fabric layer coupled to the first fabric layer to form a pouch, the second fabric layer comprising a fiber fabric spectrometer substrate comprising a fiber material including a plurality of electronic devices, the plurality of electronic devices forming at least one unit cell comprised of a red, green, blue (RGB) LED-photodiode (PD) quartet, wherein the pouch is configured to receive a colorimetric substrate. The method may also include providing within the pouch a colorimetric substrate comprising at least one colorimetric sensor element configured to undergo an electronic structure change upon reaction with an analyte such that the unit cell measures reflectance of a colorimetric sensor element of the at least one colorimetric sensor element.

In one aspect, the reflectance of the colorimetric sensor element is measured by activating the RGB LEDs in the unit cell in a frequency modulation mode to emit light onto the colorimetric sensor element.

In one aspect, the reflectance of the colorimetric sensor element is measured by the PD in the unit cell.

In one aspect, the method may also include providing within the pouch a light blocking substrate configured to reduce ambient light intensity.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Concepts, devices, and techniques are disclosed for a chemical sensor architecture based on a fabric-based spectrometer. Chemical sensors are instruments that are sensitive to various chemical substances and convert their concentrations into electrical signals for detection. The fabric-based spectrometer described herein is configured for the detection of volatile (vapor-phase) and non-volatile (liquid-phase) chemicals in a flexible, durable, and wearable form factor.

In some embodiments, a portable spectrometer for chemical sensing includes a fiber fabric spectrometer substrate comprising a fiber material including one or more electronic devices woven into a fabric. The fibers of the fabric are coupled to a control component that is programmed or otherwise configured to control the electronic devices included in the fibers to measure reflectance of a colorimetric substrate.

In some embodiments, a portable spectrometer is constructed or otherwise provided in the form of a pouch (or pocket) that includes a top fabric layer comprising a fiber fabric spectrometer substrate, a bottom fabric layer opposite the top fabric layer, and at least one opening through which a colorimetric substrate is operable to be inserted into the pouch and operable to be to be removed from the pouch. The colorimetric substrate is placed within the pouch such that the fiber fabric spectrometer substrate is operable to measure reflectance of the colorimetric substrate. The pouch is durable and wear resistant, allows easy insertion and removal of the colorimetric substrate. Furthermore, the pouch is configured such that the colorimetric substrate is placed therein, the colorimetric substrate is secured in the pouch and arranged to be physically aligned with the fiber fabric spectrometer substrate. In an embodiment, the pouch includes a closure flap hingedly or foldably connected to the bottom fabric layer and configured to be moved between a closed position and an open position over the at least one opening of the pouch.

Figure 1A:
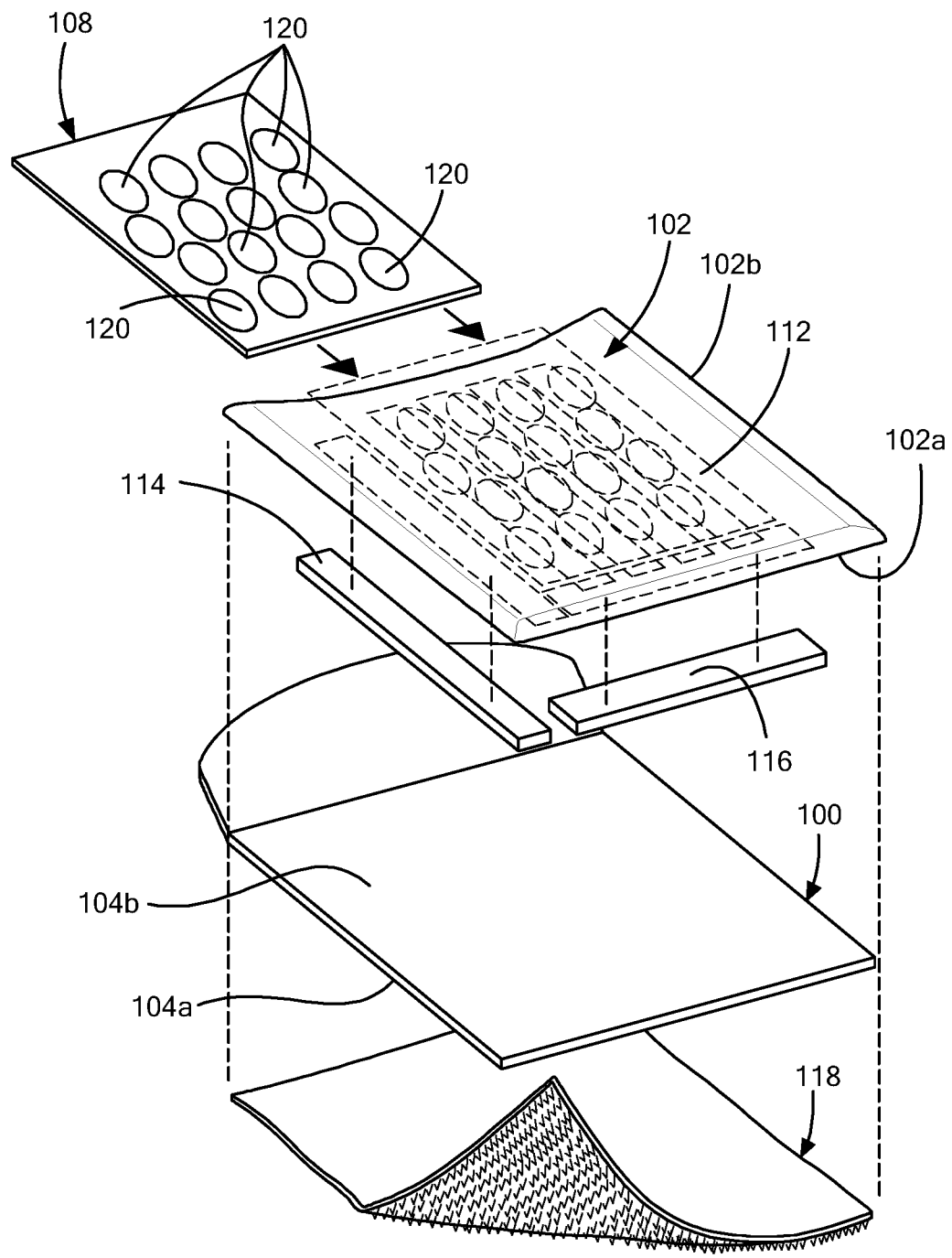
FIG. 1A is an exploded isometric view of an example portable fiber fabric spectrometer, in accordance with an embodiment of the present disclosure.
Figure 1B:
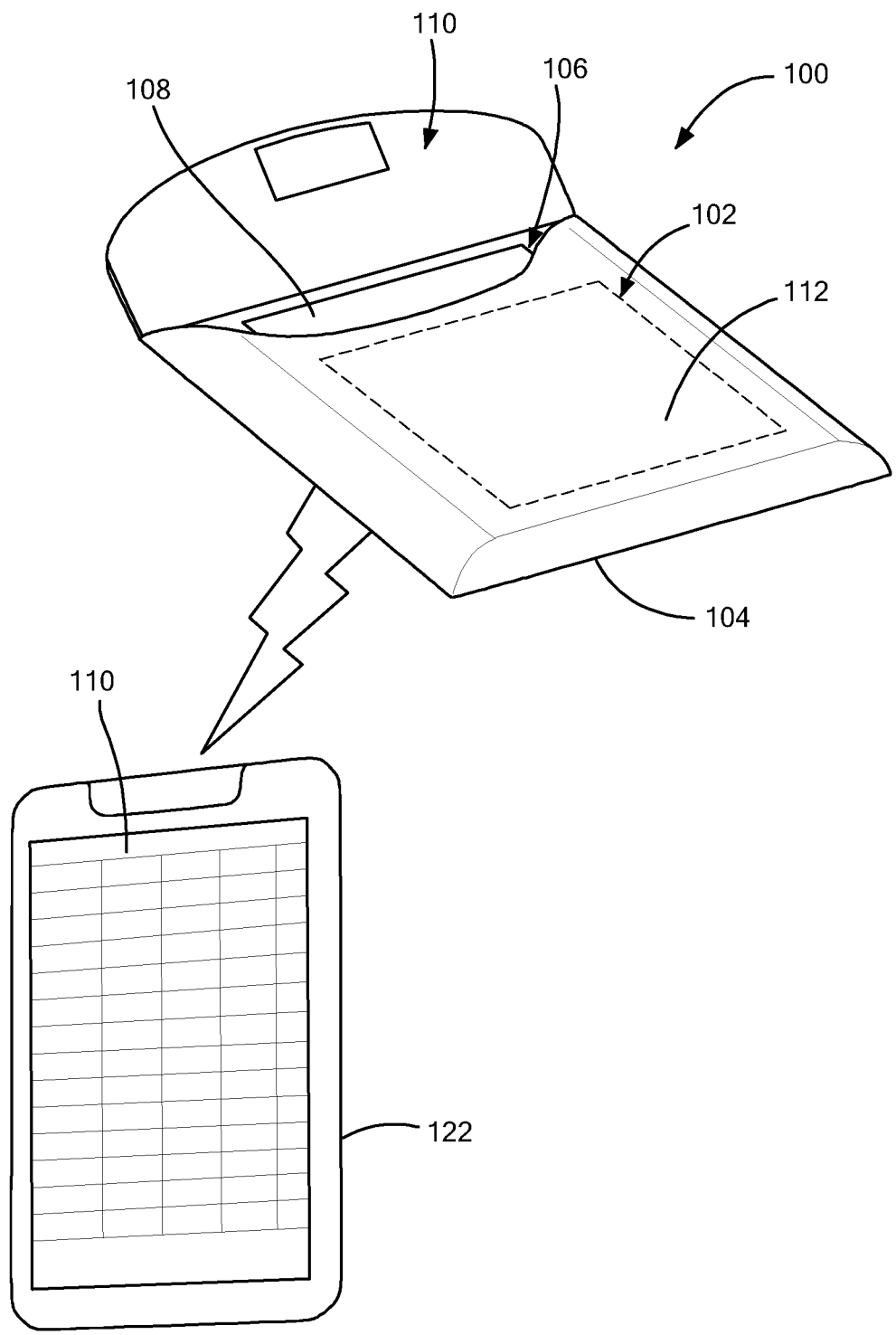
FIG. 1B is an isometric view of the assembled portable fiber fabric spectrometer of FIG. 1A.

Referring now to FIGS. 1A-1D in which like elements are provided having like reference numerals throughout the several views, an illustrative portable spectrometer 100 includes a first fabric layer 102 having first and second opposing surfaces 102a, 102b disposed over and coupled to a second fabric layer 104 having first and second opposing surfaces 104a, 104b. As illustrated in FIGS. 1A, 1B first surface 102a of first fabric layer 102 is disposed over second surface 104b of second fabric layer 104. Thus, in this example embodiment, first fabric layer 102 is sometimes referred to as a top fabric layer 102 and second fabric layer 104 is sometimes referred to as a bottom fabric layer 104.

FIG. 1B is an isometric view of the assembled portable fiber fabric spectrometer 100.

As may be most clearly seen in FIG. 1B, top and bottom fabric layers 102, 104 are coupled so as to form a pouch (or pocket or envelope structure) having at least one opening 106 and a foldable cover 110 (also sometimes referred to as a "pocket flap," a "pouch flap" or more simply a "flap"). In FIG. 1B, flap 110 is illustrated in an "open" position to reveal opening 106 having a size and shaped selected to accept colorimetric substrate 108 (that is, the pouch opening is configured such that colorimetric substrate 108 may be disposed therein). In the closed position, an inner flap surface 110 may touch surface 102b and may aid in securing the colorimetric substrate 108 within the pouch opening 106. Thus, in embodiments, the pouch of portable spectrometer 100 includes a closure flap 110 which may be hingedly or foldably connected or otherwise coupled or secured to one of the fabric layers. In embodiments, flap 110 may be coupled to an end region of one of the fabric layers 102, 104 and is configured to be moved between a closed position and an open position over the at least one opening 106 of the pouch of portable spectrometer 100. In the illustrative embodiment of FIG. 1B, flap 110 is an extension of bottom fabric layer 104 (i.e., the flap may be part of one of the fabric layers).

As noted above, top and bottom fabric layers 102, 104 are coupled to form a pouch (i.e., a receptacle) having at least one opening 106 through which (or into which) one or more colorimetric substrates 108 may be inserted and/or removed. The pouch of portable spectrometer 100 is durable and wear resistant, allows easy insertion and removal of colorimetric substrate 108, and secure placement of colorimetric substrate 108 when placed therein.

In one example embodiment, portable spectrometer 100 may be about 3 inches long, about 3 inches wide, and about 1 inch thick. However, as will be appreciated in light of this disclosure, portable spectrometer 100 may be of any suitable size that allows portable spectrometer 100 to be worn, or affixed to, and/or easily carried or moved by a person. For example, in other embodiments, the thickness of spectrometer 100 may be in the range of about 0.25 inches to about 1.5 inch. As will be appreciated in light of this disclosure, the length and width dimensions may be based on the number of unit cells included in portable spectrometer 100.

In embodiments, a fiber fabric spectrometer substrate 112 is integrated into top fabric layer 102 of portable spectrometer 100.

Figure 2:
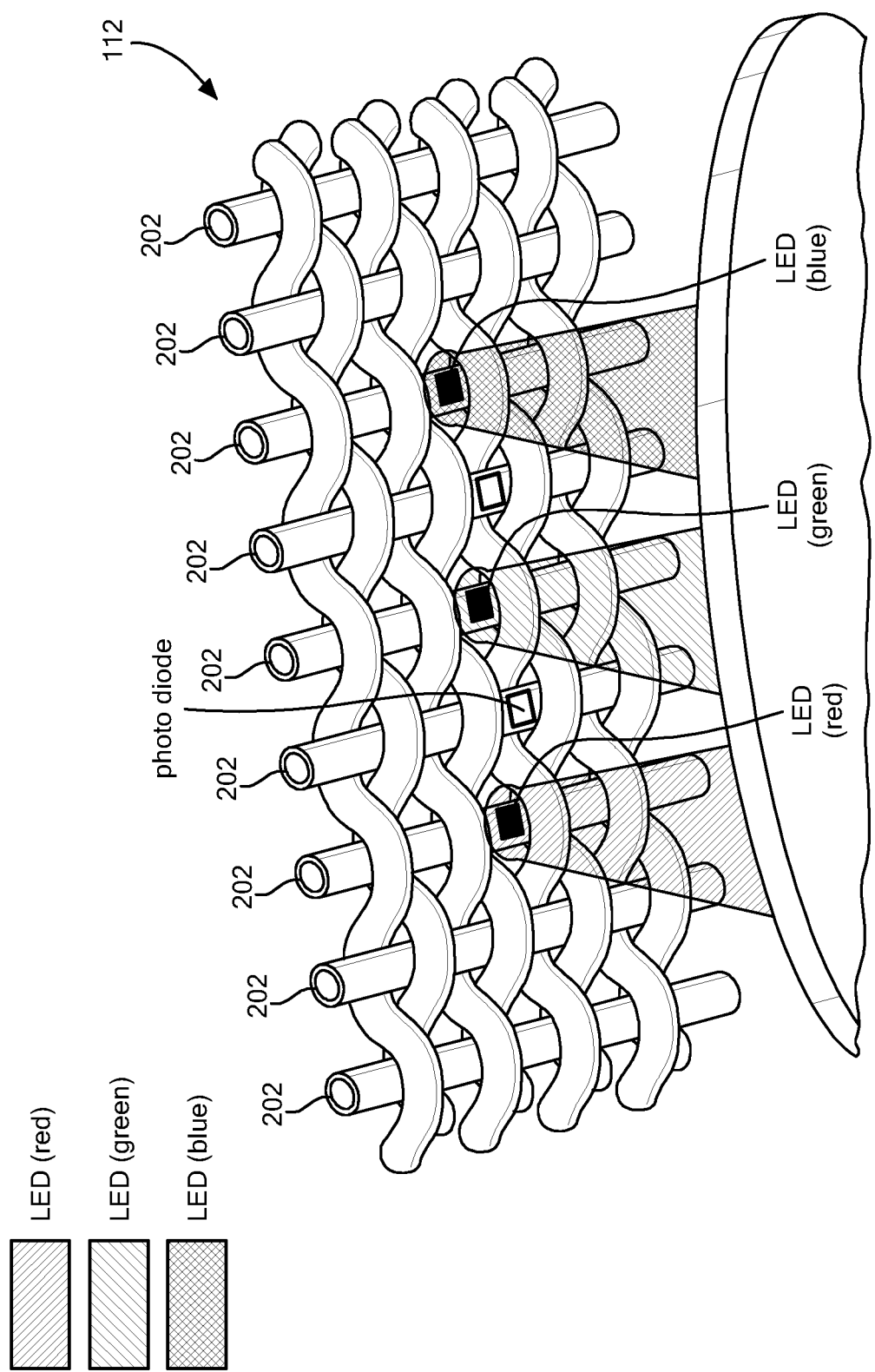
FIG. 2 is an enlarged isometric view of a portion of a fiber fabric spectrometer substrate integrated into a top fabric layer of the portable spectrometer of FIG. 1A.

As may be most clearly seen in FIG. 2, a portion of fiber fabric spectrometer substrate 112 (FIG. 1A) comprises functional fibers, such as fibers 202, containing LEDs and PDs, such as silicon (Si) photodiodes or indium gallium arsenide (InGaAs) photodiodes, woven into a fabric. Example fiber materials that can be used include, for instance, polycarbonate, poly(ether imide) (PEI), or any other suitable thermoplastic polymer.

In embodiments, fibers 202 may comprising single color LEDs and PDs are paired into RGB LED-PD groupings to form unit cells, where each unit cell is comprised of an RGB LED-PD quartet (note that FIG. 2 illustrates one unit cell of the plurality of unit cells in fiber fabric spectrometer substrate 112). Fibers 202 are woven into the fabric of fiber fabric spectrometer substrate 112 such that the LEDs and PDs in fibers 202 face substantially the same direction (i.e., substantially face the same surface). This arrangement of fibers 202 allows for integration of fiber fabric spectrometer substrate 112 into top fabric layer 102 such that the LEDs and PDs (e.g., the unit cells of fiber fabric spectrometer substrate 112) are directed inward to face a colorimetric substrate (e.g., colorimetric substrate 108 in FIG. 1A) residing within the pouch of portable spectrometer 100.

Figure 1C:
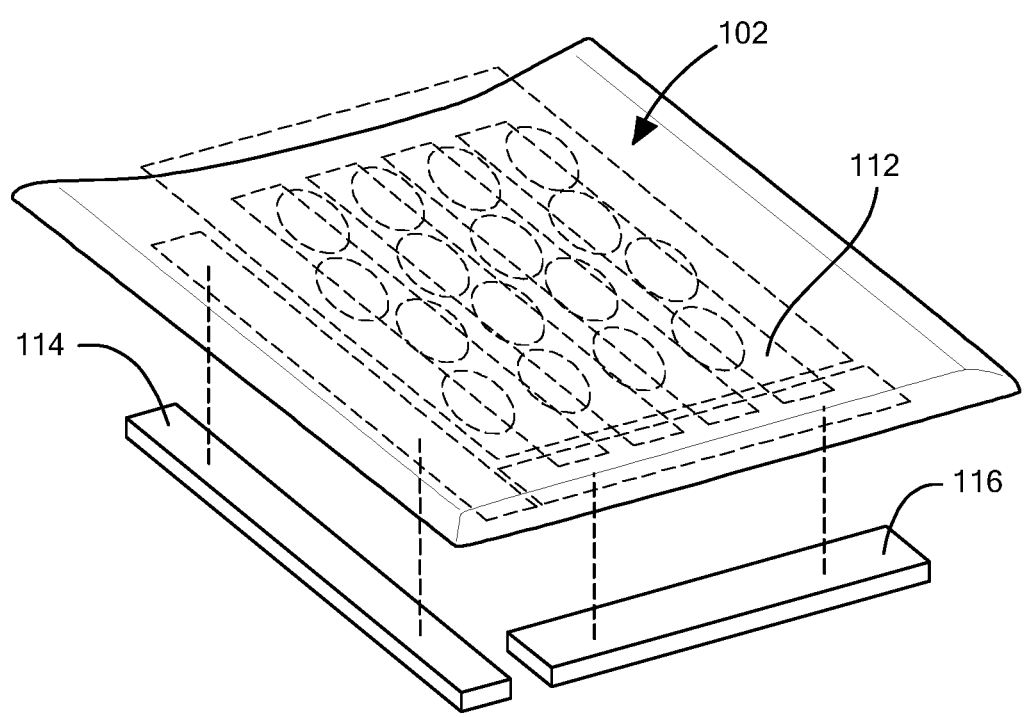
FIG. 1C is an isometric exploded view of a portion of the example portable fiber fabric spectrometer of FIG. 1A illustrating the fiber fabric spectrometer substrate integrated into a top fabric layer of the portable spectrometer of FIG. 1A.

Referring now to FIG. 1C, according to an embodiment of the present disclosure, fibers 202 of fiber fabric spectrometer substrate 112 are coupled to a control component 114 via a fiber connection bar 116. Control component 114 is configured to drive the LEDs to emit frequency-modulated light onto the individual colorimetric sensor elements (sometimes referred to herein as "colorimetric sensor spots" or "colorimetric dyes" or more simply as "dyes") on a colorimetric substrate residing within the pouch of portable spectrometer 100, and record the reflected light using the using the photodiodes to determine the light level. In an embodiment, control component 114 and/or fiber connection bar 116 may be disposed in the pouch of portable spectrometer 100. In other embodiments, control component 114 and/or fiber connection bar 116 may be integrated into a fabric layer, such as top fabric layer 102 or bottom fabric layer 104, of portable spectrometer 100.

In more detail, and in accordance with an embodiment of the present disclosure, control component 114 is configured to perform colorimetric measurements of the individual colorimetric sensor elements on a colorimetric substrate in a manner where each colorimetric sensor element is probed by a corresponding unit cell (RGB LED-PD quartet) of fiber fabric spectrometer substrate 112 to measure the RGB reflectance values to determine a quantitative change in reflectance. To this end, control component 114 may perform the colorimetric measurements in reflectance mode where control component 114 activates the red, green, and blue LEDs in a unit cell in a frequency modulation mode to emit light onto its corresponding colorimetric sensor element and observes the reflected light using the PD of the unit cell. For instance, each LED in the unit cell can be intensity-modulated (e.g., fully on to fully off) at a different frequency f, thus enabling frequency-division multiplexing of a photocurrent signal produced by the unit cell. Additionally or alternatively, each LED in a unit cell may be activated in sequence with a frequency modulation, and the signal for that color LED may be recorded before moving on to the next LED in the unit cell. Furthermore, LED colors other than red, green and blue may be used. One of ordinary skill in the art will appreciate how to select a particular light color or a particular group or sequence of light colors to use in a particular application.

Control component 114 may then implement a mathematical transform to decompose the reflected light signal into its constituent frequencies. For example, control component 114 may perform a Fourier transform (e.g., a Fast-Fourier transform) to reconstruct the relative transmission changes for the R, G, and B signals. The amplitude of the R, G, and B signals is the amount of light the photodiode observes in the respective color channel. The observed spectral changes are the result of an analyte specific chemical reaction with the colorimetric sensor element. In other embodiments, control component 114 may perform the colorimetric measurements in double-pass transmission mode. Note that the use of frequency-modulated light reduces (and ideally negates) the effects of background ambient light that may be observed by the photodiode, which is a source of system noise.

In an embodiment, control component 114 may be configured to perform a calibration of the unit cells. For example, in one implementation, control component 114 may perform the calibration at system start up (e.g., power ON of portable spectrometer 100) using a white colored card and a black colored card that are inserted sequentially into the pouch of portable spectrometer 100 to calibrate the measured light at the two extremes. Additionally or alternatively, a colorimetric substrate may include separate white and black colored spots to allow for performing a continual self-calibration during operation.

Figure 1D:
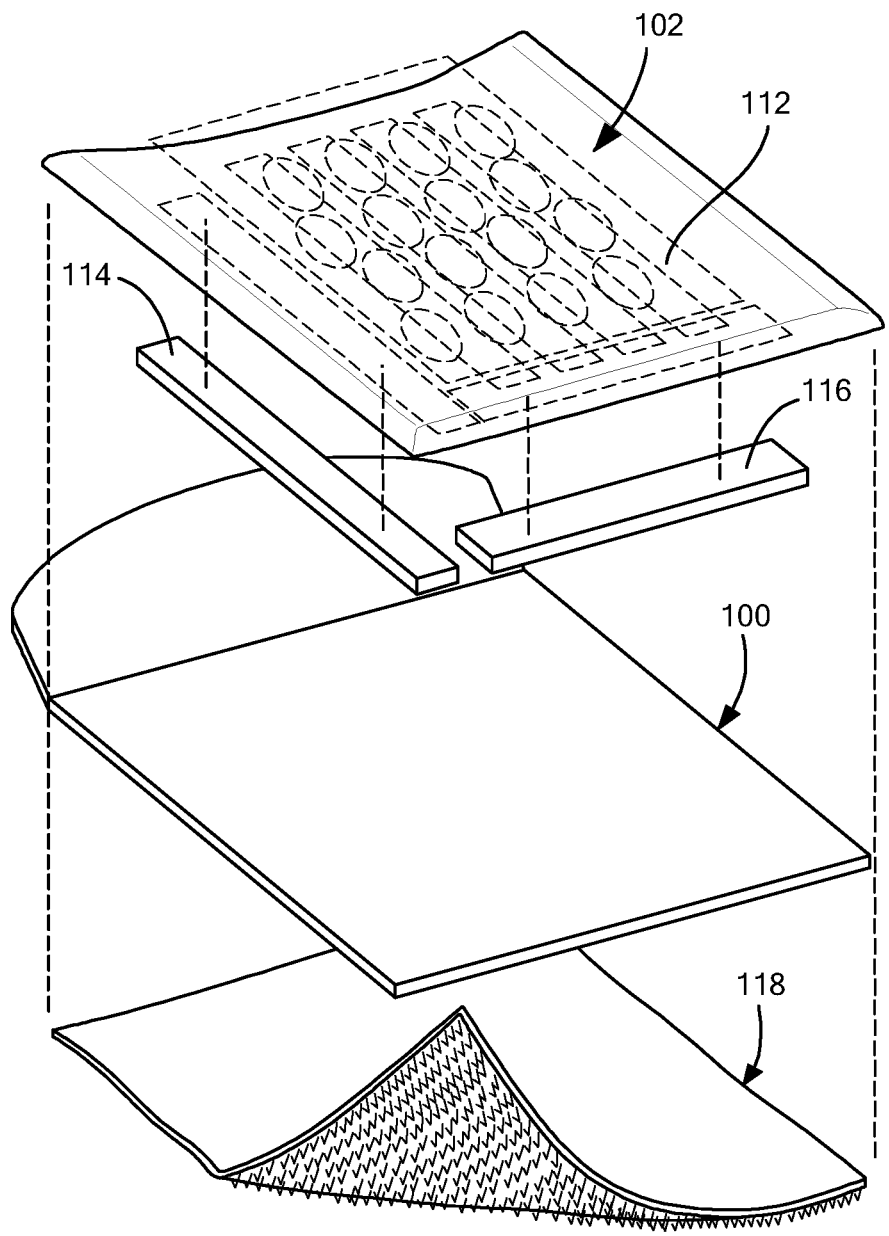
FIG. 1D is an isometric exploded view of a portion of the example portable fiber fabric spectrometer of FIG. 1A including an optional fastening layer.

Referring now to FIG. 1D, in some embodiments, portable spectrometer 100 may include a fastening layer 118 for fastening or otherwise securing portable spectrometer 100 to a surface, such as an outer surface of a garment (e.g., a shirt) worn by a person. As can be seen in FIG. 1D, fastening layer 118 may be affixed to an outer surface of bottom fabric layer 104 of portable spectrometer 100. In an embodiment, fastening layer 118 may be one strip or component of a hook-and-loop, hook-and-pile, or touch fastener that allows for removably or temporarily fastening portable spectrometer 100. For example, in the case of a hook-and-pile fastener, the other strip or component of the fastener can be affixed to the outer surface of a garment to allow for removably fastening portable spectrometer 100 to the garment. In other embodiments, depending on the intended use of portable spectrometer 100, for example, fastening layer 118 may allow for a more secure or permanent fastening of portable spectrometer 100 to a surface.

As is now evident from FIGS. 1A-1D, colorimetric substrate 108 may be inserted into the pouch opening of portable spectrometer 100. Portable spectrometer 100 may be activated (powered ON) using a control (not shown). In some embodiments, colorimetric substrate 108 may be comprised of a fabric, paper, cardboard, glass, or any other suitable material, and includes one or more reactive colorimetric dyes 120 that are sensitive to a particular chemical or a class of chemicals (e.g., a toxic industrial chemical). Colorimetric dyes 120, which may be coated, applied, or otherwise deposited onto colorimetric substrate 108 undergo an electronic structure change (e.g., chemical reaction) upon reaction with an analyte. The chemical reaction may be specific to the reactive functional group in the chemical (e.g., colorimetric dye). Note that for specific chemical identification, colorimetric substrate 108 may include multiple colorimetric dyes 120 having different reactivity, and identification made based on the specific color change pattern of the entire dye set.

Once inserted into the opening of the pouch formed by the first and second fabric layers, colorimetric substrate 108 is ideally in a particular mechanical alignment with the fiber fabric spectrometer. In an embodiment, colorimetric substrate 108 can be sized such that colorimetric substrate 108 fits within the pouch of portable spectrometer 100 in a mechanically secure manner with minimal (and ideally no) tolerance to help ensure a particular mechanical alignment with the fiber fabric spectrometer. That is, once inserted into the opening of the pouch formed by the first and second fabric layers, the colorimetric substrate 108 has minimal and ideally no wiggle room. Additionally or alternatively, portable spectrometer 100 may include an aligning means, such as guides, tracks, or rails, (not shown) for guiding, inserting and positioning colorimetric substrate 108 within the pouch of portable spectrometer 100 into a desired position. Properly sizing colorimetric substrate 108 in this manner allows for depositing the dye spots (colorimetric dyes 120) at the correct locations on colorimetric substrate 108 such that, when placed within the pouch of portable spectrometer 100, the dye spots on colorimetric substrate 108 are aligned with a corresponding unit cell of fiber fabric spectrometer substrate 112.

Referring again to FIG. 1B, portable spectrometer 100 may be communicatively coupled to a mobile device 122. Non-limiting examples of mobile device 122 include a smart phone or other mobile communication device that may communicate with portable spectrometer 100 to receive and/or send data to portable spectrometer 100. For example, in an embodiment, mobile device 122 may be programmed or otherwise include a software application that is configured to receive chemical threat exposure notifications from portable spectrometer 100 and provide appropriate alerts, such as an audible alert, a visible alert, a haptic alert, and/or combinations thereof. This allows a user of portable spectrometer 100 to carry mobile device 122 and timely receive the chemical threat exposure alerts. In some embodiment, portable spectrometer 100 may provide the warnings and alerts itself without using mobile device 122.

In some embodiments, mobile device 122 may be configured to provide a user interface, such as a graphical user interface, with which a user can interact with portable spectrometer 100. For example, using the user interface, the user may be able to power ON and power OFF portable spectrometer 100. The user interface may also display portable spectrometer 100 operational data for viewing by the user, allow for inputting of alarm settings and/or parameters, and/or allow for specifying the type of output signals (e.g., audible, haptic, visual, etc.). In some implementations, mobile device 122 may also provide a live feed of the signals.

Still referring to FIG. 1B, communication between portable spectrometer 100 and mobile device 122 may be via wireless and/or wired communication. Examples of wireless communication include Internet, Bluetooth®, Wi-Fi®, WiMAX®, radio frequency (RF), Near Field Communication (NFC), and ZigBee®, to provide a few examples. Examples of wired communication include USB, FireWire (IEEE 1394), and RS232, to provide a few examples.

Figure 3A:
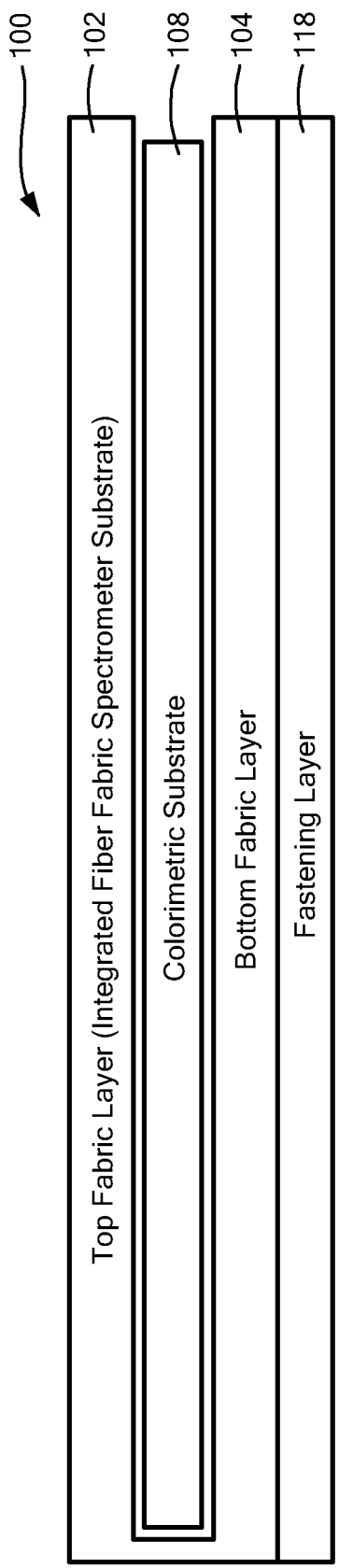
FIG. 3A illustrates a cross-section of the portable spectrometer of FIG. 4A including a colorimetric substrate, in accordance with an embodiment of the present disclosure.

FIG. 3A illustrates a cross-sectional view of a portable fiber fabric spectrometer which may be the same as or similar to a portable fiber fabric spectrometer 100 of FIGS. 1A-1D including a colorimetric substrate which may be the same as or similar to colorimetric substrate 108. As shown in FIG. 3A, portable spectrometer 100 includes top fabric layer 102 and bottom fabric layer 104 forming the upper and lower layers, respectively, of a pouch. Colorimetric substrate 108 can be inserted into the pouch such that colorimetric substrate 108 is between top fabric layer 102 and bottom fabric layer 104, as shown. As described previously, colorimetric substrate 108 is inserted into the pouch such that the dye spots on colorimetric substrate 108 face upward toward the unit cells of the fiber fabric spectrometer included in top fabric layer 102 to allow for probing of the dye spots by the unit cells. In the example embodiment of FIG. 3A, portable fiber fabric spectrometer 100 includes an optional fastening layer 118 disposed over a surface of the bottom fabric layer 104.

Figure 3B:
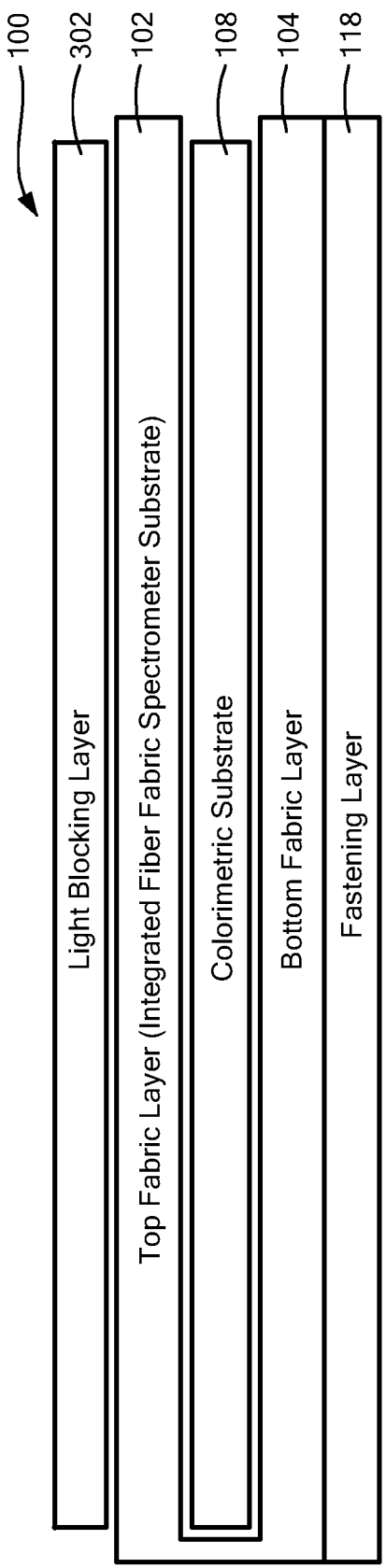
FIG. 3B illustrates a cross-section of the portable spectrometer of FIG. 4A including a colorimetric substrate and a light blocking layer, in accordance with an embodiment of the present disclosure.

FIG. 3B illustrates a cross-sectional view of a portable fiber fabric spectrometer which may be the same as or similar to a portable fiber fabric spectrometer 100 of FIGS. 1A-1D including a colorimetric substrate which may be the same as or similar to colorimetric substrate 108. The portable spectrometer 100 of FIG. 3B includes an optional light blocking layer 302, in accordance with an embodiment of the present disclosure. The illustrated cross-section of portable spectrometer 100 is substantially similar to the illustration in FIGS. 1A-1D. Unless context dictates otherwise, those components in FIG. 3B that are labelled identically to components of FIG. 3A will not be described again for the purposes of clarity.

As shown in FIG. 3B, portable spectrometer 100 also includes an optional light blocking layer 302 configured to reduce ambient light intensity. In operation, light blocking layer 302 effectively shields portable spectrometer 100 from ambient light. Note that there may be a desire or, in some cases, a need to reduce the ambient intensity as the ambient light may cause a high but not constant background against which measurements are made. Such changing baselines may make setting alarm thresholds difficult. Also note that light blocking layer 302 may or may not be wavelength selective.

In some embodiments, light blocking layer 302 may be implemented using substrates including, for example, a dark colored (and ideally black colored) fabric that is porous to vapor but not see-through. Light blocking layer 302 can be positioned, disposed over, disposed on or otherwise placed on the top of portable spectrometer 100, such as, for example, positioned on top of top fabric layer 102 of portable spectrometer 100, as shown.

Example I

In order to identify a chemical agent class or a specific chemical, a matrix of dyes, each having different reactivity to different functional groups, was utilized. In particular, dyes that respond to ammonia vapor were of interest as this toxic industrial chemical (TIC) is relatively safe to handle in a lab environment. A pH indicator, bromophenol blue (BPB), which is sensitive to ammonia, was used for this analyte.

Colorimetric dyes work by changes to their electronic structure upon reaction with an analyte. This electronic change is manifested as a visual color change. Ammonia sensitive dye BPB was dissolved in a poly(vinyl butyral-co-vinyl alcohol-co-vinyl acetate) (pVBVAVA) solution and spin coated onto a glass substrate as a thin film.

Figure 4A:
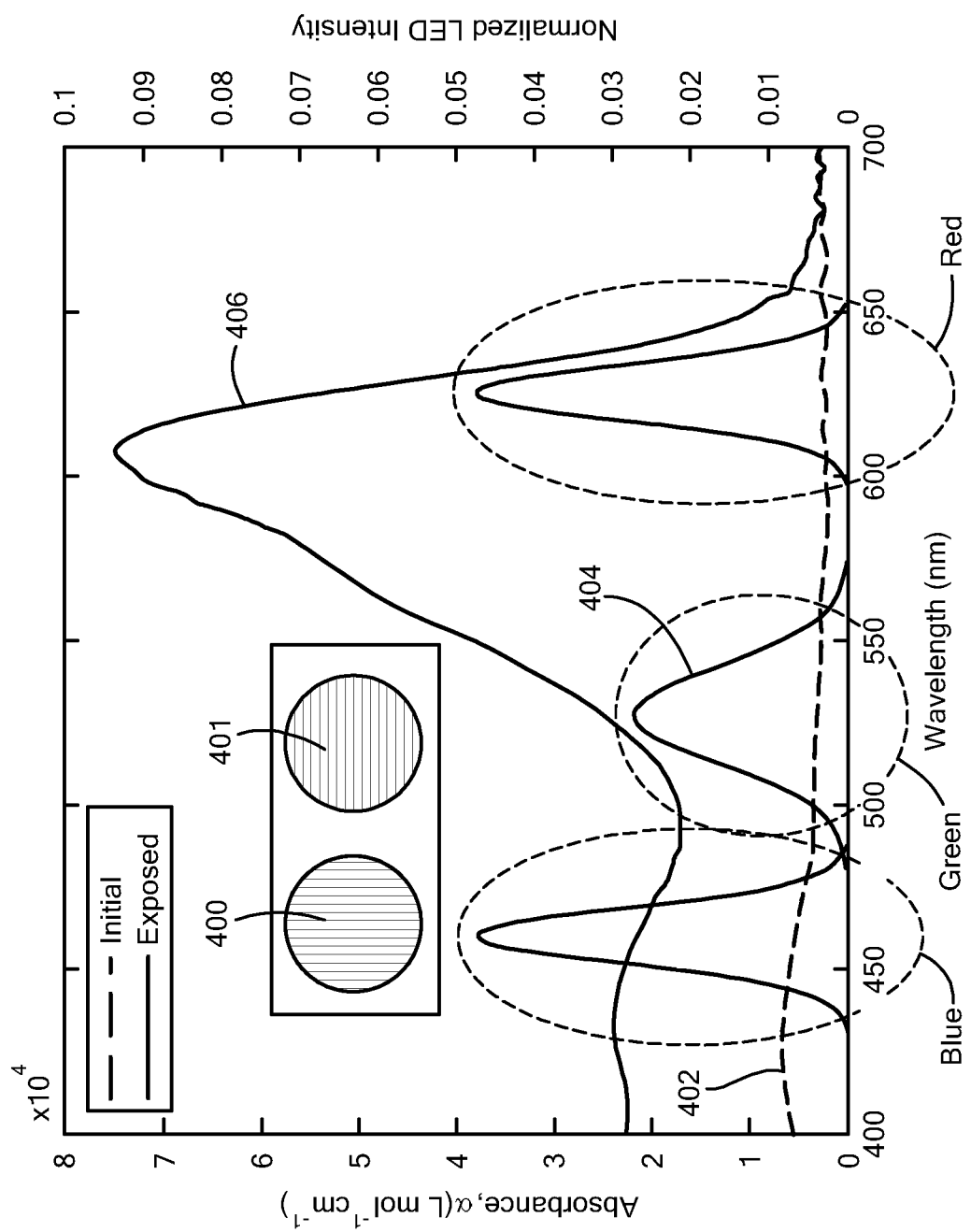
FIGS. 4A and 4B are plots showing absorbance spectra and normalized light-emitting diode (LED) emission profiles.

FIG. 4A is a plot showing dye BPB changes from pale yellow to dark blue and normalized LED intensities of red, green, and blue LEDs used in the fiber fabric spectrometer, where the area under each curve is normalized to unity. As can be seen, FIG. 4A shows that there is spectral overlap between the dye in one or both states and the LED wavelengths so that the light can interact with the dye.

Quantitatively, as shown in the inset of FIG. 4A, thin films of BPB were initially pale yellow (indicated by vertical cross-hatching and reference numeral 400) and changed to blue (indicated by horizontal cross-hatching and reference numeral 401) upon exposure to ammonia vapors for about 30 seconds (sec) in a static chamber. This was observed in the corresponding absorption spectra where curve 402 illustrates that the initial film of BPB displays a nearly featureless absorption spectrum, while curves 404, 406 for the exposed film of BPB illustrate that a large absorption band ($\lambda_{max}$~610 nm) appears with a small absorption band at about 430 nm.

In this example embodiment, the fiber fabric spectrometer used three different color LEDs to obtain a pseudo-visible reflectance spectrum of the dye. It will, of course, be understood by those of ordinary skill in the art that in some applications two different color LEDs may be used. In still other embodiments 4 or more different color LED's may be used.

Figure 4B:
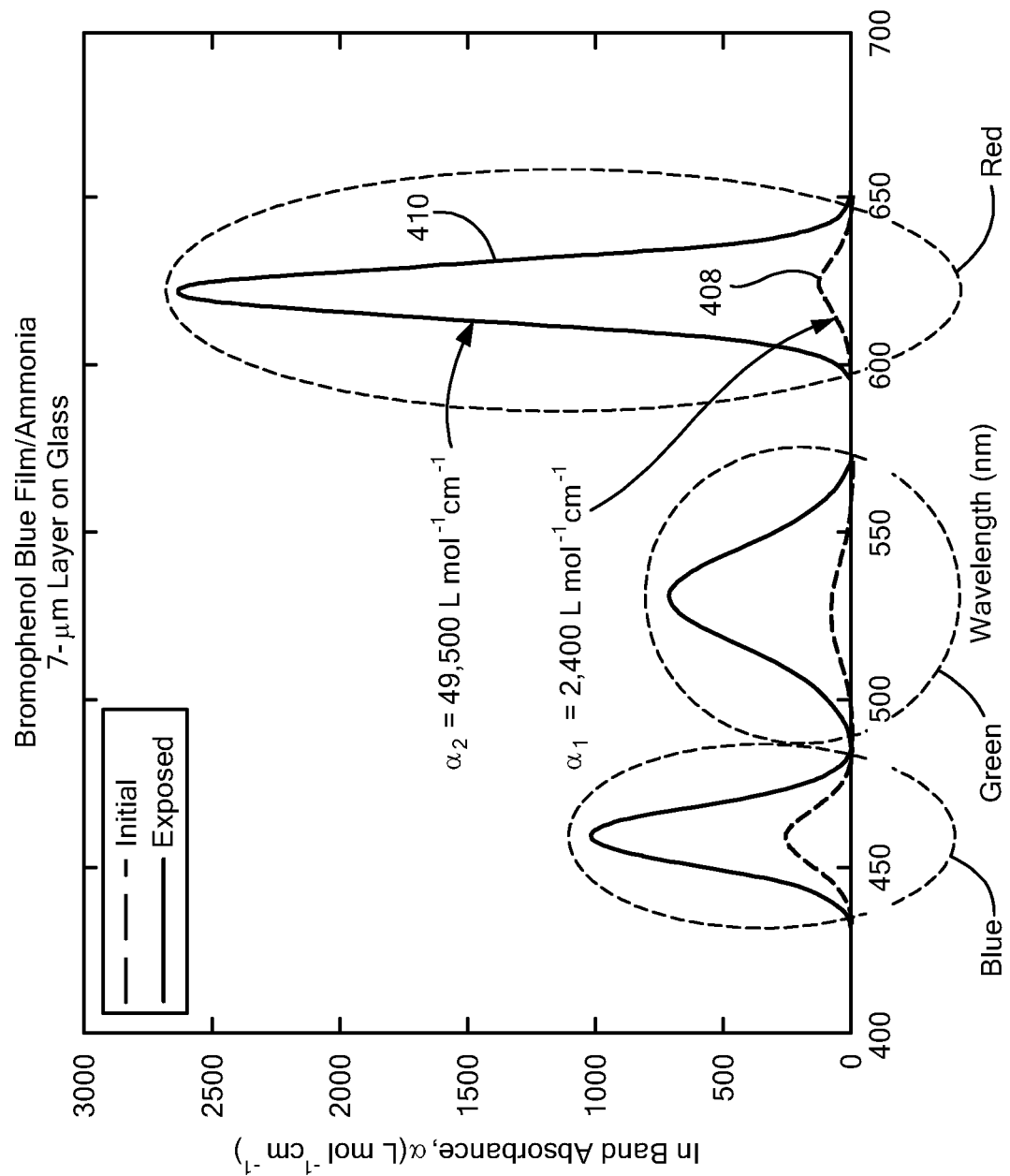

FIG. 4B is a plot showing normalized LED emission profiles of the LEDs used in the fiber fabric spectrometer. The area under each curve 408, 410 was normalized to an area=1. The "visible spectrum" that the fiber fabric spectrometer records (shown in FIG. 4B) were obtained by multiplying the absorbance spectra in FIG. 4A by the normalized emission intensity in FIG. 4B. The area under each curve was integrated to obtain the effective dye absorbance, $\alpha$(L mol$^{-1}$ cm$^{-1}$), for each LED channel and each state, where $\alpha_1$ is the initial unreacted state of the dye and $\alpha_2$ is the final reacted state. Thus, curves 408, 410 in FIG. 4B show the integrated absorption in each color band, derived by, for instance, multiplying the LED emission profile by the dye absorption spectra in FIG. 4A. This is what the spectrometer 'sees.' (observes).

Example II

Figure 8:
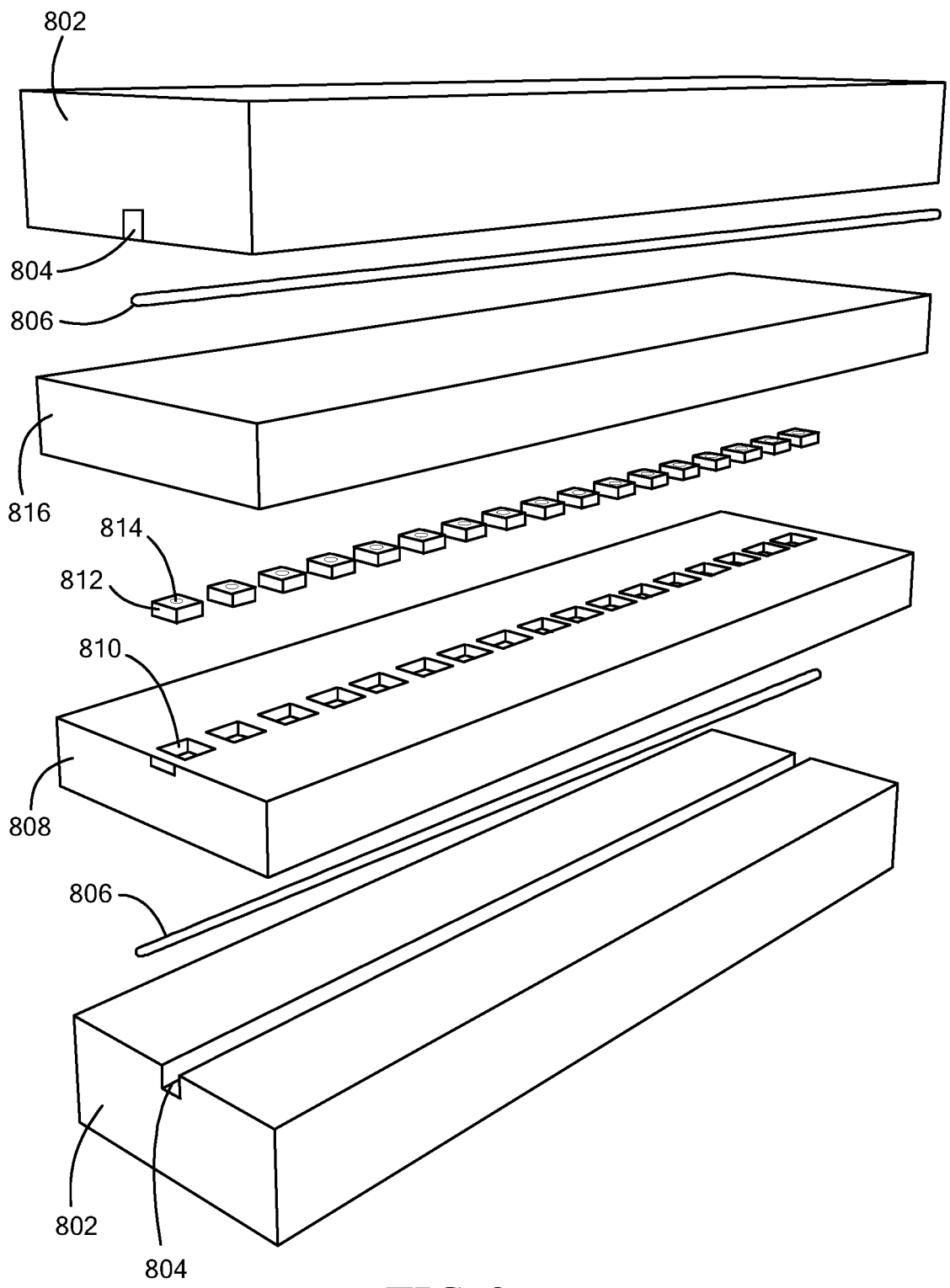
FIG. 8 illustrates an exploded view of an example preform structure for producing the fiber of FIG. 7, in accordance with an embodiment of the present disclosure.

A fiber including LED devices, photodiodes, and electrical conductors for making electrical connection to the devices was thermally drawn. First, a polycarbonate preform was designed and fabricated, as shown in FIG. 8 having a width of about 1 inch, a length of about 8 inches, and a thickness of about 0.5 inches. Pockets 810 in the polycarbonate slabs were milled to hold the LEDs or photodiodes. In addition, grooves 804, each having a width of about 1.25 mm and a depth of about 1.65 mm, were milled in two other polycarbonate slabs as channels to feed in copper wire to provide electrical connectivity. The polycarbonate slabs were pressed and heated to form a single polycarbonate block with embedded devices. The consolidation was conducted in a hot press, at a temperature of 170° C., for 5 minutes. Small round pockets having a diameter of 250 μm and depth of 70 μm were milled in the device orientation layer, spaced 1.25 mm apart. A total of 40 pockets were milled, 80 mm from the preform ends.

In one example embodiment, commercial LED devices (ultrathin Gen 3 LEDs (blue, green); TCO-07UOR red LEDs; ThreeOFive Materials InGaAs/InP PIN photodiode) from Cree Optoelectronics, Inc. Durham, N.C., were manually placed in the milled pockets, with the anodes of the devices oriented in the same direction, which was marked on the preform.

Figure 9:
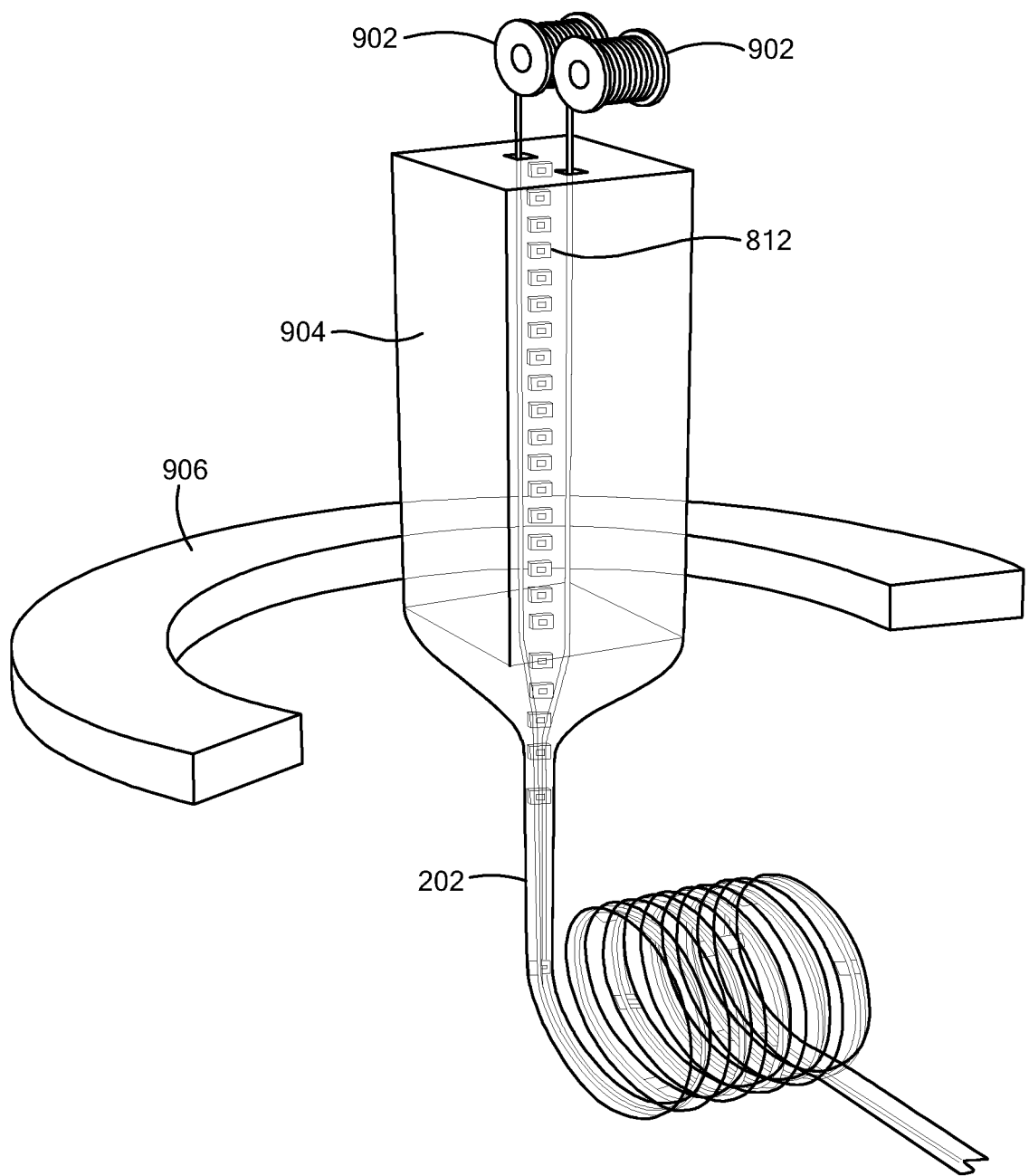
FIG. 9 illustrates an example preform loaded onto a thermal draw tower for drawing a fiber including electrical devices, in accordance with an embodiment of the present disclosure.

The polycarbonate preform was then loaded into a thermal draw tower and heated above its glass transition temperature as a pulling force was applied in the manner shown in FIG. 9. Two 50 μm-diameter Wwires were guided through the channels in the preform as in the manner shown in FIG. 9. A 32-ounce weight was attached to the bottom of the preform and the W wires that were guided through the preform were tied to the weight. The bate-off of the preform was achieved at the three-zone thermal drawing temperature. The top zone temperature was set to 150° C., the middle zone temperature was set to 270° C., and the bottom zone temperature was set to 110° C. After the onset of the bate-off the fiber was guided through a capstan and drawn. The drawing conditions were set with a feed speed of 1 mm/min and a draw speed of 1.6 mm/min. The middle drawing zone temperature was then lowered to 260° C. With these drawing conditions, the drawn fiber diameter was 650 μm, and each rigid LED device in the fiber had dimensions of 170 μm×170 μm×50 μm. As the polycarbonate preform was drawn, the diodes separated axially, and the copper wires were gradually brought into contact with the diodes in the neck-down region.

After the draw, several approximately 12 inch long sections of fiber, with each diode electrically connected by the two copper wires, were cut from the drawn fiber. These fiber sections were then cut into approximately four (4) inch final sections. The copper wires were then attached, and the cut fibers were woven into a functional fiber fabric spectrometer. The fibers were connected to a control component, which included a MatLab interface, to drive the LEDs and record the reflected signal.

Colorimetric sensor spots of BPB (30 wt % by mass in pVBVAVA) were deposited onto a porous filter paper substrate and placed over the fiber fabric spectrometer. The sensor was then exposed to various concentrations of ammonia vapor and the response was recorded as a function of exposure dose (a concentration-time produce).

Figure 5A:
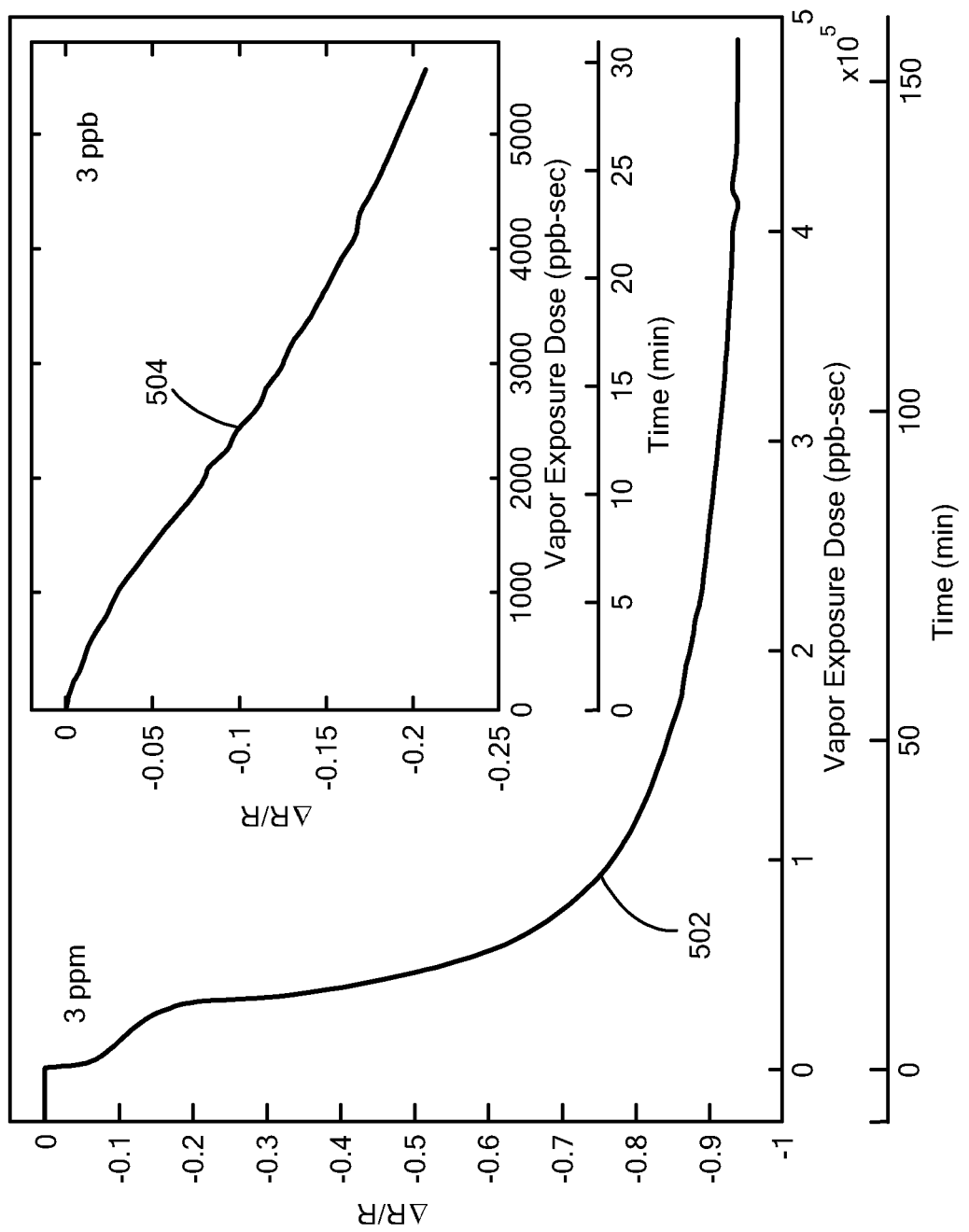
FIGS. 5A and 5B are plots showing changes in the red channel reflectivity for the fabric-based spectrometer.

Referring not to FIG. 5A, curve 502 illustrates a change in the red channel reflectivity, which had the maximum change in absorbance (shown in FIG. 4B), as a function of vapor exposure dose for the fiber fabric spectrometer with a BPB sensing spot when exposed to 3 parts per million (ppm) of ammonia vapor. FIG. 5A inset (curve 504) is a plot of the same experiment with 3 parts per billion (ppb) of ammonia vapor. For the higher 3 ppm concentration, the signal changed rapidly within 1 second before plateauing after about 2 minutes. At lower concentration (3 ppb), the process is slower, but a measurable change was recorded in less than about 30 seconds.

These data were replotted as the absolute change in reflection (signal intensity) versus vapor exposure dose in log-log space and then compared to what the Beer's Law model (see Eq. 1 below) that takes into account the fractional conversion, f, of the dye between the two states.

$$\left|\frac{\Delta I}{I}\right| = \frac{I_f - I_i}{I_i} = \frac{I_o\left[e^{-(\alpha_1 + f(\alpha_2 - \alpha_1))cl} - e^{\alpha_1 cl}\right]}{I_A + I_L + I_{OB} + I_o e^{-\alpha_1 cl}} \quad [1]$$

where $I_o$ is the light intensity from a source, $I_f$ is the light intensity of the device with the dye in the final state, $I_i$ is the light intensity of the dye in the initial (unreacted) state, c is the dye concentration, l is the path length that the light travels through the dye layer, $\alpha_1$ is the dye absorption coefficient in the initial state, and $\alpha_2$ is the dye absorption coefficient in the final state.

Using the absorbance values (shown in FIG. 4B) and the dye concentration (c) and the experimentally determined path length (l), while neglecting the contributions from ambient light ($I_A$), laterally transmitted light ($I_L$), and out-of-band light ($I_{OB}$), the expected fiber fabric spectrometer device performance in sensing ammonia vapors with two different reaction efficiency fitting parameters was determined.

Figure 5B:
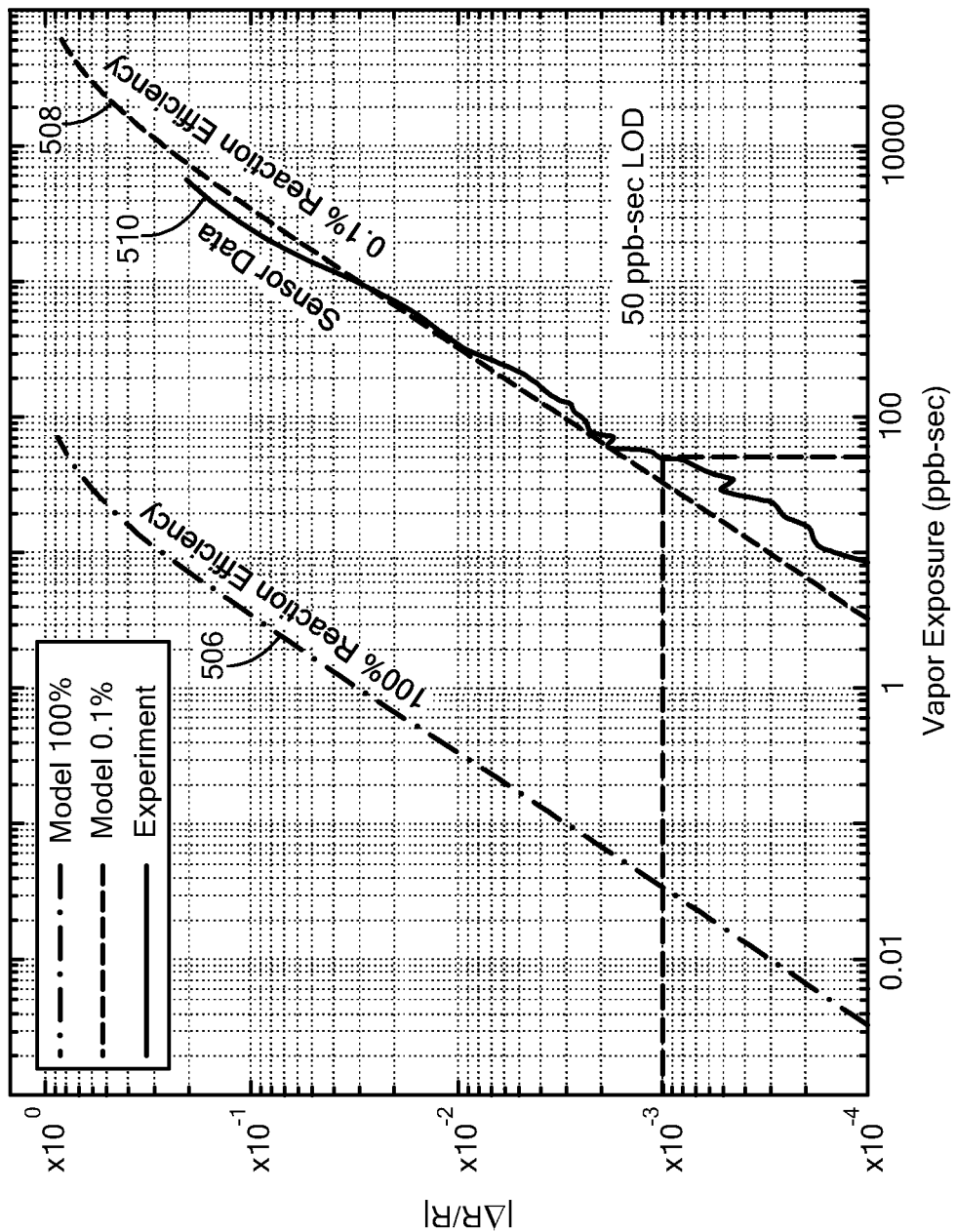

Referring now to FIG. 5B, is a plot of the change in red channel reflectivity versus ammonia vapor exposure showing the ideal sensor at 100% reaction efficiency (curve 506), 0.1% reaction efficiency (curve 508) and the sensor data collected during the 3 ppb vapor exposure measurement (curve 510). As shown in FIG. 5B, the actual sensor data, based on measurements using 3 ppb ammonia vapor, was directly correlated to the model. The sensor data was a good fit for the model with a 0.1% reaction efficiency. It was concluded that this low efficiency was driven by the high vapor pressure of the ammonia analyte, such that the molecule quickly diffused in and out of the polymer film prior to reaction with the dye molecule. With the sensor resolution arbitrarily set to about 1%, the limit of detection of the sensor was about 50 ppb·sec, which translates to being able to detect about 3 ppb of ammonia vapor in 17 seconds. Note that, with a dose limit of detection, there is a reciprocal relationship between concentration and detection time. Higher doses can be detected in shorter times and vice versa, with the product of those being, in this case, 50 ppb-sec.

To put these results in context, the performance of the fiber fabric spectrometer versus other commercially available and laboratory-developed sensors was plotted.

Figure 6:
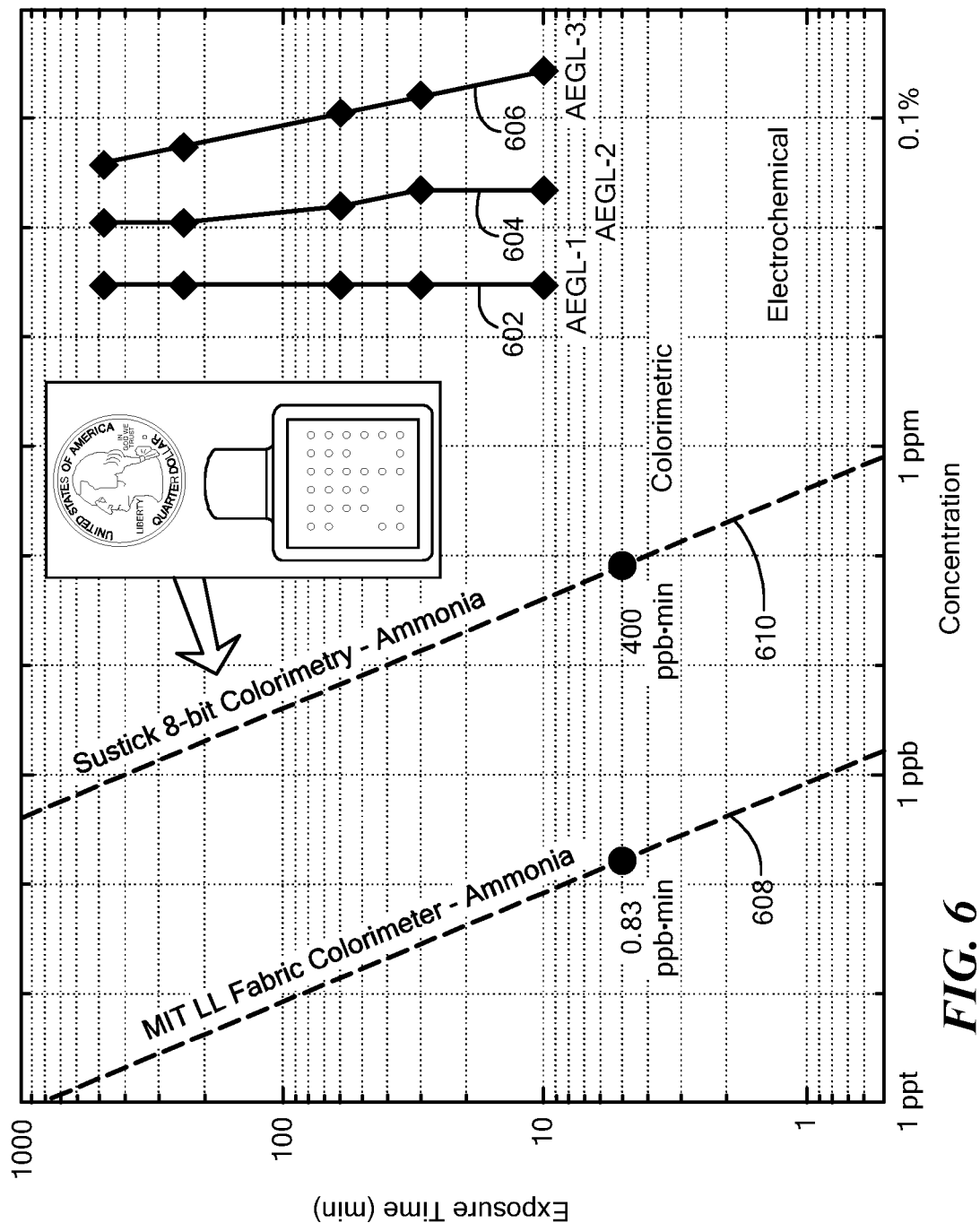
FIG. 6 is a plot of vapor exposure time versus vapor concentration.

FIG. 6 is a plot of vapor exposure time vs vapor concentration. In the upper right curves 602, 604, 606 correspond to the Environmental Protection Agency EPA acute exposure guideline limits (AEGL) for noticeable effects (curve 602 corresponds to AEGL-1), incapacitation (curve 604 corresponds to AEGL-2), and death (curve 606 corresponds to AEGL-3) for 10 min. through 8-hour exposures to ammonia. Also shown in FIG. 6 are the general performance space for a number of commercial sensors based on colorimetric and electromechanical technologies. Curve 610 in FIG. 6 is data for ammonia detection published by Suslick and co-workers (Feng, L., Musto, C. J., Kemling, J. W., Lim, S. H., and Suslick, K. S., "A colorimetric sensor array for identification of toxic gases below permissible exposure limits," Chem. Commun. 46(12), 2037-2039 (2010)), showing performance better than that of the commercially available detectors. In this same technology space, it was shown that the performance of the fiber fabric spectrometer (curve 608) in detecting ammonia was nearly three orders of magnitude more sensitive than Suslick's imaging-based sensor array.

Figure 7:
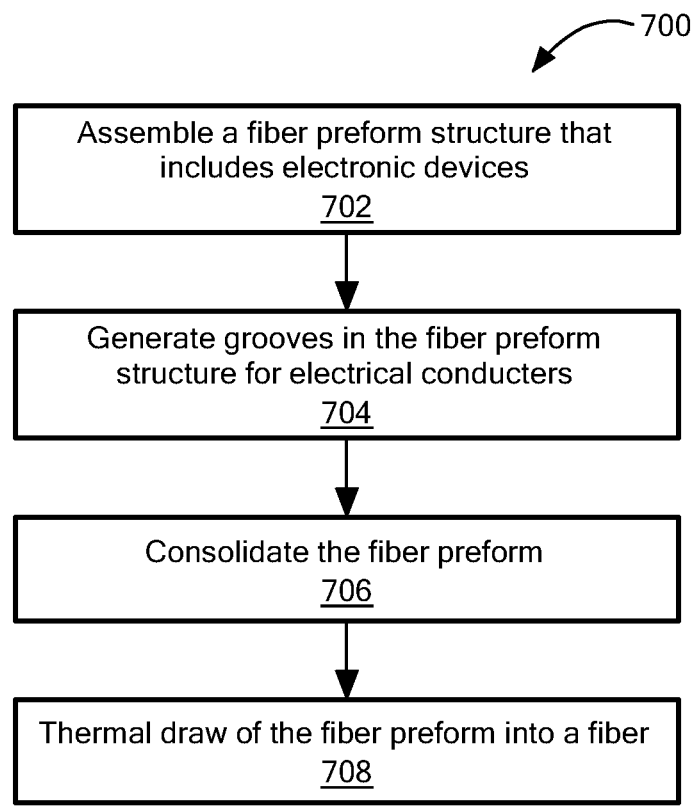
FIG. 7 is a flow diagram of an example process for thermally drawing a fiber for use in a fiber fabric spectrometer, in accordance with an embodiment of the present disclosure.

Referring now to FIG. 7, an example process 700 for thermally drawing a fiber, in accordance with an embodiment of the present disclosure. The thermally drawn fiber includes a fiber body within which electronic devices, such as microelectronic devices or photonic devices, are disposed at sites along the fiber body. The electronic devices are arranged in a linear sequence, i.e., single file, along at least a portion of the fiber body length. There is a space between adjacent electronic devices along the sequence of electronic devices. Each device can be provided with at least one electrical contact pad for making one or more electrical connections to the electronic device. In some embodiments, the fiber can be woven into a fabric for use in a fiber fabric spectrometer substrate. To this end, electrical conductors are disposed within the fiber body along at least a portion of the fiber length in contact with the electronic device contact pads.

With reference to process 700 of FIG. 7, at 702, a fiber preform structure that includes electronic devices is assembled. In an example configuration, the electronic devices are held in pockets arranged in the fiber preform structure. The electronic devices can be microelectronic devices, photonic devices, opto-electronic devices, micro-electromechanical devices, or other electronic devices. The electronic devices are fully functional outside of the fiber; that is, the electronic devices do not require the fiber configuration for operation and thus are conventional stand-alone devices, such as a microfabricated microelectronic devices. The electronic devices have one or more operational functionalities, such as light emission, for example, as a light emitting diode (LED) device, light detection, or other functionality. The electronic devices include or are provided with electrical contact pads, for example, disposed in the fiber preform structure, to enable electrical connection to the electronic devices for achieving the intended electronic device operational functionality once the fiber is drawn.

At 704, grooves are generated in the fiber preform structure for electrical conductors. The grooves may be generated to feed in electrical conductors to provide electrical contact with the electronic devices in the fiber. The electrical conductors disposed in the fiber for making electrical contact to the electrical contact pads of the electronic devices can be provided of materials that co-flow with the fiber body material at a common fiber draw temperature, or can be provided of materials that do not flow at the fiber draw temperature. In either case, the electrical conductors are electrically conductive connection media.

Whatever material is selected for electrical conductors, the selected material demonstrates sufficient conductivity and mechanical strength and is the correct size for the fiber configuration. Wires, ribbons, or other structures to be employed as electrical conductors in the fiber do not include an insulating surface layer and can withstand the mechanical stress of the thermal draw process.

For any electrical conductor material provided within the fiber, the electrical conductors can exist along at least a portion of the fiber length and, in some cases, exist along the entire length of the fiber, connected to the devices along the fiber length. To make the electrical connection from the electrical conductors within the fiber to electrical elements that are external to the fiber, such as a voltage source, current source, sensing circuit, or computational element, the wires are exposed from the encapsulating fiber body material at an end of the fiber, in a manner similar to that employed conventionally for exposing electrical wires that are coated in outer insulation layer, or any method suitable for exposing wires in fibers or cables, such as by cutting, chemical dissolution and removal, plasma and laser etching, or other suitable method.

Where electrical conductors extend along a fiber length connected to device contact pads along the fiber length, the electrical devices are electrically connected in parallel along the fiber length. For example, LED devices sited along a fiber length and each connected to electrical conductors along the fiber length are connected in parallel along the fiber length. Two, three, four, or more electrical conductors can be provided along the fiber length, within the fiber body. Thus, devices having more than two electrical terminals, such as transistors, can be operated while disposed within the fiber.

Note that the operations of 702 and 704 of may be performed in reverse order or at the same time or otherwise in an overlapping contemporaneous fashion.

At 706, the fiber preform may optionally be thermally consolidated by heating under pressure, as necessary, for example, to form intimate material interfaces between materials (e.g., electronic devices and electrical contact pads) arranged in the fiber preform. The fiber preform can be thermally consolidation multiple times, for example, after each of fiber body materials, devices, and conductors are introduced into the preform.

At 708, the fiber preform is thermally drawn into a fiber material having a fiber body within which are disposed the electronic devices and the electrical conductors in contact with the electrical contact pads of the electronic devices. The thermal drawing process produces extended lengths of fiber body material along which are sited rigid electronic devices, and along which are provided electrical conductors for operating the electrical devices within the fiber body, all internal to the fiber body.

FIG. 8 illustrates an exploded view of an example preform structure for producing the fiber fabric spectrometer described above in conjunction with FIGS. 1A-1E, in accordance with an embodiment of the present disclosure. As shown, the preform structure includes electronic devices 812 to be included in the thermally drawn fiber. Each electronic device 812 includes at least one electrical contact pad 814 for making electrical contact to electronic device 812 when encapsulated in the fiber body material. As shown in FIG. 8, electrical contact pad 814 is shown on an upper surface of electronic devices 812. A second electrical contact pad 814 may also be disposed on a lower surface of the electronic devices 812.

The preform structure includes a device orientation layer 808 having a topology for accepting and orienting one or more electronic devices 812 in the fiber preform. In the example shown in FIG. 8, device orientation layer 808 includes pockets 810 for holding electronic devices 812. In an embodiment, pocket 810 can have an extent that is slightly larger than the planar extent of electronic device 812 and can have a depth that is slightly deeper than the height of electronic device 812. Note that this slotted or grooved topology is not required but can aid in orienting electronic devices 812 to achieve positioning of electronic devices 812 within the drawn fiber at intended device sites along the fiber length. Also note that each electronic device 812 can be arranged in the device orientation shown in FIG. 8 so that the electronic devices' planar componentry is parallel to the longitudinal axis of the fiber. This configuration may be beneficial for enabling an arrangement of electrodes along the fiber length for making electrical connection to the electronic devices.

The preform structure also includes a separation layer 816. Separation layer 816 is arranged for positioning on electrical devices 812 on the device surface opposite that to be fitted in device orientation layer 808.

Still referring to the example embodiment illustrated in FIG. 8, if the electrical conductors to be included within the drawn fiber are formed of material that melts during the thermal fiber drawing, then electrical conductors 806 are provided in the preform for making electrical connection to the upper and lower contact pads of electrical devices 812 in the fiber. As shown, the preform structure includes a conductor orientation layer 808 for each electrical conductor 806. Conductor orientation layer 808 may include a groove 804 for accepting and orienting electrical conductor 806. While two electrical conductors 806 are shown in the example of FIG. 8, any number of electrical conductors 806 can be included, each with a separated groove 804 for orienting a particular electrical conductor 806. Grooves 804 are configured and sized based on the geometry of electrical conductors 806 to be embedded in the fiber with the electrical devices for making electrical connection to the electrical devices.

Note that, in cases where the electrical conductors are fed into the preform during the fiber draw process (e.g., electrical conductors are of materials that co-flow with the fiber body material at a common fiber draw temperature), electrical conductors 806 are not provided within the preform.

FIG. 9 illustrates an example preform 904 loaded onto a thermal draw tower for drawing a fiber 202 including electronic devices 812, in accordance with an embodiment of the present disclosure. For example, preform 904 may be a preform structure, such as the preform structure of FIG. 8, after consolidation and removal of any spacer layers that may have been provided during the assembly of the preform structure. As shown, preform 904 is loaded onto a thermal draw tower, shown schematically as a heating zone 906 in FIG. 9, and heated under tension. For example, in the case where preform 904 is a polycarbonate preform, preform 904 is heated above its glass transition temperature as a pulling force is applied. This causes preform 904 to be drawn such that the lateral dimensions shrink while the longitudinal dimension increases. As preform 904 is drawn (i.e., necks down), electronic devices 812 separate axially, and electrical conductors 902, such as copper wires, for example, provided in on one or more spools 908 are fed in during the draw and gradually brought into contact with electronic devices 812 in the neck down region to generate a spool of fiber 202 including electronic devices 812. Note that wires to be fed into preform 904 to be employed as electrical conductors 902 in the fiber do not include a surface insulation layer and can withstand the mechanical stress of the thermal draw process.

Additional details regarding the thermal draw of a fiber including devices from a preform are provided in U.S. Patent Application Publication No. 20180039036, entitled: "Thermally-Drawn Fiber Including Devices," filed Jul. 27, 2017, and now issued as U.S. Pat. No. 10,509,186, which is incorporated herein by reference in its entirety.

In some embodiments, electronic devices 812 included in fiber 202 include LEDs and photodiodes (PDs). The spool of fiber 202, with each diode connected by the two electrical conductors 902 (e.g., wires), can be cut to a desired length and electrical conductors 902 attached. The cut fibers 202 can be woven into a functional fiber fabric spectrometer. Fibers 202 can then be coupled to a control component that is programmed or otherwise configured to control (i.e., drive) the LEDs included in fibers 202 and record the reflected signal. The functional fiber fabric spectrometer and the control component are further described at least in conjunction with FIGS. 1A-3B.

Figure 10:
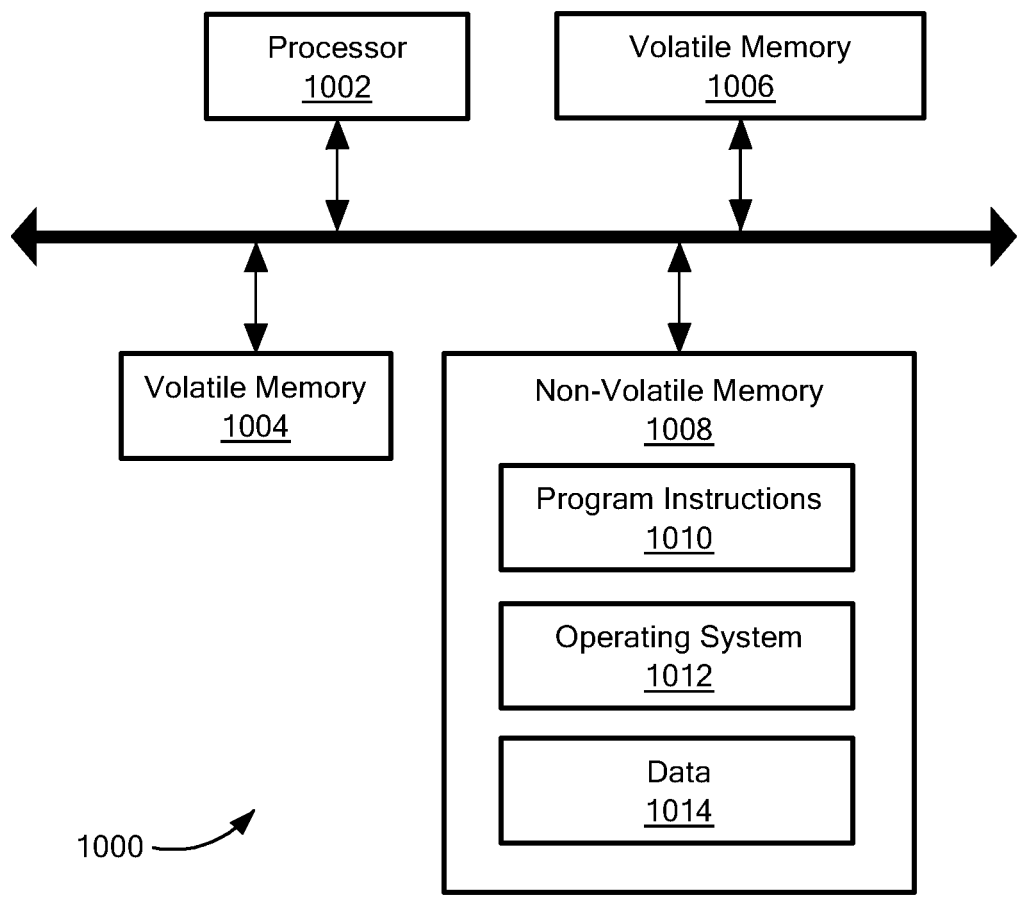
FIG. 10 is a block diagram illustrating selective components of an example computing device in which various aspects of the disclosure may be implemented, in accordance with an embodiment of the present disclosure.

FIG. 10 is a block diagram illustrating selective components of an example computing device 1000 in which various aspects of the disclosure may be implemented, in accordance with an embodiment of the present disclosure. In various implementations, computing device 1000 may be a network system or a network node—control component for controlling the spectrometer. As shown in FIG. 10, computing device 1000 includes a processor 1002, a volatile memory 1004 (e.g., random access memory (RAM)), a communication module 1006, and non-volatile memory 1008. Processor 1002, volatile memory 1004, communication module 1006, and non-volatile memory 1008 may be communicatively coupled. In various embodiments, additional components (not illustrated, such as a display, communication interface, input/output interface, etc.) or a subset of the illustrated components can be employed without deviating from the scope of the present disclosure.

Non-volatile memory 1008 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

Non-volatile memory 1008 stores program instructions 1010, an operating system 1012, and data 1014 such that, for example, computer instructions of operating system 1012 and/or program instructions 1010 are executed by processor 1002 out of volatile memory 1004. For example, in some embodiments, program instructions 1010 and data 1014 may cause computing device 1000 to implement functionality in accordance with the various embodiments and/or examples with respect to the control component of the fiber fabric spectrometer substrate described herein. In some embodiments, volatile memory 1004 may include one or more types of RAM and/or a cache memory that may offer a faster response time than a main memory.

Processor 1002 may be implemented by one or more programmable processors to execute one or more executable instructions, such as program instructions 1010 and/or a computer program, to perform or direct performance of any number of operations described in the present disclosure. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, processor 1002 can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. Processor 1002 may be analog, digital or mixed signal. In some embodiments, processor 1002 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communication module 1006 can be any appropriate network chip or chipset which allows for wired or wireless communication via a network, such as, by way of example, a local area network (e.g., a home-based or office network), a wide area network (e.g., the Internet), a peer-to-peer network (e.g., a Bluetooth connection), or a combination of such networks, whether public, private, or both. Communication module 1006 can also be configured to provide intra-device communications via a bus or an interconnect.

With the description and examples provided above, it is demonstrated that the chemical sensor architecture based on the fiber fabric spectrometer with separate sensing element enables chemical sensing including, but not limited to chemical threat sensing.

The processes described herein are not limited to use with hardware and software of computing device 1000 of FIG. 10. Rather, the processes may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product (e.g., in a non-transitory machine-readable storage medium such as, for example, a non-transitory computer-readable medium) for execution by, or to control the execution of, data processing apparatus (e.g., a programmable processor, a computer, or multiple computers). Each such program may be implemented in a high-level procedural, functional, or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed one computer or multiple computers at one site or distributed across multiple sites and interconnected by a communication network. A computer program may be stored on a non-transitory machine-readable medium or device that is readable by a general or special purpose programmable computer for configuring and operating the computer when the non-transitory machine-readable medium or device is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disk, flash memory, non-volatile memory, volatile memory, magnetic diskette, and so forth but does not include a transitory signal per se.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Various embodiments of the concepts, systems, devices, structures and techniques sought to be protected are described herein with reference to the related drawings. Alternative embodiments can be devised without departing from the scope of the concepts, systems, devices, structures and techniques described herein. It is noted that various connections and positional relationships (e.g., over, below, adjacent, etc.) are set forth between elements in the following description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, the terms "upper," "lower," "right," "left," "vertical," "horizontal, "top," "bottom," and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary layers or structures at the interface of the two elements.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect, connecting, and coupling.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A portable spectrometer device comprising:
    a first fabric layer;
    a control component; and
    a second fabric layer coupled to the first fabric layer to form a pouch, the second fabric layer comprising a fiber fabric spectrometer substrate comprising a fiber material including one or more electronic devices coupled to the control component programmed to measure reflectance of a removable colorimetric substrate inserted into the pouch, wherein
    the control component is disposed in the pouch, the control component coupled to the fiber fabric spectrometer substrate and configured to control at least one of the one or more electronic devices of the fiber fabric spectrometer substrate.

2. The portable spectrometer device of claim 1, wherein a surface of the removable colorimetric substrate is disposed over a surface of the fiber fabric spectrometer substrate.

3. The portable spectrometer device of claim 1, wherein the removable colorimetric substrate comprises at least one colorimetric sensor element, the at least one colorimetric sensor element configured to undergo an electronic structure change upon reaction with an analyte.

4. The portable spectrometer device of claim 1, further comprising means for aligning the removable colorimetric substrate with the fiber fabric spectrometer substrate.

5. The portable spectrometer device of claim 1, further comprising means for calibrating the fiber fabric spectrometer substrate.

6. The portable spectrometer device of claim 1, wherein:
    the one or more electronic devices comprise a plurality of light emitting diodes (LEDs) and a plurality of photodiodes; and
    the removable colorimetric substrate is disposed such that at least some of the plurality of light emitting diodes (LEDs) and the plurality of photodiodes face the removable colorimetric substrate.

7. The portable spectrometer device of claim 1, wherein the one or more electronic devices comprise at least one of: a plurality of light emitting diodes (LEDs); and a plurality of photodiodes.

8. The portable spectrometer device of claim 7, wherein the plurality of LEDs emit frequency modulated light onto the removable colorimetric substrate.

9. The portable spectrometer device of claim 7, wherein the plurality of photodiodes detects reflectance of light from the removable colorimetric substrate.

10. The portable spectrometer device of claim 7, wherein the plurality of photodiodes comprises one of silicon (Si) photodiodes or indium gallium arsenide (InGaAs) photodiodes.

11. The portable spectrometer device of claim 7, wherein the one or more electronic devices comprise at least one red, green, blue (RGB) LED-photodiode (PD) quartet, the at least one RGB LED-PD quartet configured to detect reflectance of light from the removable colorimetric substrate.

12. The portable spectrometer device of claim 1, further comprising a light blocking substrate configured to reduce ambient light intensity, the light blocking substrate disposed such that the removable colorimetric substrate is between the fiber fabric spectrometer substrate and the light blocking substrate.

13. The portable spectrometer device of claim 1, wherein the removable colorimetric substrate is comprised of a fabric, paper, or glass.

* * * * *